United States Patent
Booton et al.

(10) Patent No.: US 6,263,072 B1
(45) Date of Patent: Jul. 17, 2001

(54) COMPUTER TELEPHONY INTEGRATED NETWORK

(75) Inventors: Laurence Jon Booton; Andrew Michael Lucking, both of Suffolk (GB)

(73) Assignee: British Telecommunications plc, London (GB)

( * ) Notice: Subject to any disclaimer, the term of this patent is extended or adjusted under 35 U.S.C. 154(b) by 0 days.

(21) Appl. No.: 09/091,663

(22) PCT Filed: Apr. 20, 1998

(86) PCT No.: PCT/GB98/01137

§ 371 Date: Jun. 22, 1998

§ 102(e) Date: Jun. 22, 1998

(87) PCT Pub. No.: WO98/48558

PCT Pub. Date: Oct. 29, 1998

(30) Foreign Application Priority Data

Apr. 18, 1997 (GB) .................................................. 9707863

(51) Int. Cl.⁷ ............................ H04M 1/00; H04M 11/00
(52) U.S. Cl. ..................... 379/373; 379/106.09; 379/252
(58) Field of Search .............................. 379/90.01, 93.01, 379/93.08–93.11, 93.23, 201, 203, 210–212, 221, 265, 273–274, 372–376, 106.01, 106.05, 106.09, 250–252

(56) References Cited

U.S. PATENT DOCUMENTS

| 4,653,090 | 3/1987 | Hayden ................................ 379/396 |
| 4,866,758 | 9/1989 | Heinzelmann ..................... 379/93.15 |
| 5,592,541 | * 1/1997 | Fleischer, III et al. ............... 379/230 |
| 5,655,014 | * 8/1997 | Walsh et al. .......................... 379/201 |
| 5,835,571 | * 11/1998 | Johnson .............................. 379/93.08 |
| 5,835,582 | * 11/1998 | Masuda et al. ...................... 379/252 |
| 5,862,134 | * 1/1999 | Deng ................................. 379/93.09 |

FOREIGN PATENT DOCUMENTS

| 2294178 | 4/1996 | (GB) . |
| WO 89 06076A | 6/1989 | (WO) . |

OTHER PUBLICATIONS

Johnson et al, "Computer Telephony Integration the Meridian 1 PBX", British Telecommunications Engineering, vol. 15, No. Part 02, Jul. 1996, pp. 150–155.

* cited by examiner

Primary Examiner—Curtis Kuntz
Assistant Examiner—George Eng
(74) Attorney, Agent, or Firm—Nixon & Vanderhye p.c.

(57) ABSTRACT

The invention concerns an integrated computer and telephony system and a method of integrated computer telephony in which at least one main is switch is capable of receiving incoming telephone calls and of dialling outgoing calls. A computer terminal is associated with the switch and means are provided for recognising that a telephone number connected to the switch as an incoming call is associated with said computer terminal; together with and means for causing said computer terminal to give an indication that an incoming call has been received, with the call being held by the switch so that the computer terminal indication is without the telephone being caused to ring.

21 Claims, 3 Drawing Sheets

COMPUTER TELEPHONY INTEGRATED NETWORK

BACKGROUND OF THE INVENTION

1. Field of the Invention

The present invention concerns systems which utilize the combined capabilities of computers and telephony.

2. Related Art

Historically computers and telephony have occupied different areas in the overall field of technology with the exception of the increasing use of computer technology in controlling and managing telephone networks. However there is now a rapid convergence in these two areas so that the boundaries between computing and telephony are becoming harder to define. Thus computers, as well as being used to control telephones, can have special telephone interfaces that carry out the telephony functions; additionally information carried over telephone lines can be detected by computers and used to handle the calls more efficiently.

One of the forces driving the integration of computing and telephony is that modern businesses have a growing need to unite individuals in different locations into project teams. Another concept uniting computing and telephony is that of the "hot desk" where an individual does not necessarily have a single defined office location but may rather be migratory so that his/her office is defined at the point of logging-in to a computer terminal, a procedure which obviously can occur at widely spaced locations given the great increase in computer networks. Thus while the server of the computer network will know at log-on where the user is located this is not necessarily so for the user's telephone number.

Thus the present invention is concerned with the situation in which members of a work group can easily remain in touch independently of location, for example at multiple offices, at home and when mobile.

A system has evolved to meet these needs, which is known as Computer Telephony Integration (CTI). A set of protocols and standards for CTI have also arisen and these standards are known as Standards ECMA-217 SERVICES FOR COMPUTER SUPPORTED TELECOMMUNICATIONS APPLICATIONS PHASE I, and Standards ECMA-218 SERVICES FOR COMPUTER SUPPORTED TELECOMMUNICATIONS APPLICATIONS PHASE II.

In what follows it will be assumed that these standards are met by the specific embodiment to be described, but it will be appreciated that the inventive concept to be set out later does not necessarily demand that the protocols of the above standards are followed.

One system involving CTI has been developed by British Telecommunications Limited and is known as Distributed Office Technology (DOT). In a DOT network each telephone user has an associated terminal by means of which he/she can log into what can be referred to as a virtual work group. Once logged-on the user will be provided on the associated monitor with a visual indication of each member of the team. Both the telephony and physical status of each member of the virtual work group is thus displaced on the monitor, which can be the screen of a standard PC which acts as the terminal. Users may add and remove members from the work group at any time. This can be achieved by dragging and dropping a new individual from a directory onto the work group. When a user receives a phone call, not only does the telephone ring at the physical location but the user's icon will flash and a screen pop will appear. Every other member of the virtual work group who has logged in will be able to see that the particular member of the team has a call ringing. The user can analyze the screen pop, and answer or reject the call. The screen pop will at the very least give the number of the incoming call and, if available, the network database additional relevant information concerning the caller. However the fact that a system as just described has come into existence has been largely caused by the mobility of the members of the work group. An obvious result of such mobility is that an intended recipient of a call can be at one of many locations, which can include being at home where there may be no computer terminal, or actually travelling and thus only contactable on a mobile phone.

In our co-pending UK Patent Application No. 9707862.0 of even date a solution to this problem is described.

Another problem brought about by the concept of the virtual work group scattered over a range of different locations is that as the size of the group increases it becomes more and more important for members of the group to be both informed and selective with regard to the reception of incoming calls.

One problem with on line switches is that while they may provide a group function, so that when a user hears a phone ringing which is not his he can pick up his phone and use the group function to interrupt the call. This however cannot normally be done outside a PBX switch. Additionally if a call is made to one number, it is not possible via CTI simply to then ask a PBX switch to redirect the call to another number. The call has to be aborted and the calling process restarted. Thus the basic problem remains that once the CTI system has delivered a call to a telephone it is frequently impossible to redirect the call even if it has not been answered. This position in local networks if an intended recipient has a phone number outside the local network.

The present invention is concerned with providing a simple solution to these various problems.

U.S. Pat. No. 4,653,090 discloses a method of setting up, manipulating and taking down communication connections utilizing graphics screens at computer terminals. In that method, a traditional telephone instrument which would normally be connected via a conventional link to a conventional communication system is replaced by signal controller, a speakerphone and a computer. The signal controller terminates the conventional link from the communication system and provides separate signalling and voice links, the signalling link being connected to both the computer and the speakerphone, and the voice link being connected to the speakerphone only. The communication system is not aware that it is not connected to a traditional telephone instrument.

Upon receipt of an incoming call, the communication system behaves in conventional manner, i.e. refers to its internal routing table to obtain the identity of the line to which the incoming call is to be connected, and alerts that line in the conventional manner as if there were a traditional telephone instrument connected to that line.

The computer emulates the button presses of a traditional telephone instrument in accordance with user selection and control of screen icons representing users of the communication system, and the disclosure is principally concerned with facilitating conference calls via computer inputted commands, and does not answer the problem concerning the delivery of calls to a phone as already set out.

GB Patent Specification No. GB-A-2294178 (Fujitsu Limited) discloses a CTI arrangement comprising a switch unit with associated telephones, and a host unit connected to computer terminals. Generally, the telephones are associated with respective ones of the computer terminals. Thus, when the switch unit receives a call for one of its telephones, it rings that telephone and informs the host unit that it is applying ringing to that called directory number. The host unit performs a lookup to obtain the identity of the computer terminal associated with that telephone, and sends to that computer terminal an instruction for displaying a message corresponding to the alert.

Fujitsu Limited discloses several embodiments, including: the sharing of a common telephone by two users, each working at a respective computer terminal associated with that common telephone having two different directory numbers allocated to it; the delivery of a call to the intended recipient when he is logged on at a computer terminal which is not his "home" computer terminal; and the delivery of a call to a representative of the intended recipient. Where users have a fixed association with the telephones, the switch unit always rings the intended recipient and informs the host unit. In embodiments where users can log in at computer terminals other than their "home" computer terminal; the switch unit waits for the host unit to instruct it as to where the intended recipient, or his appointed representative, is located, i.e. the directory number to be rung, and rings that telephone, and the host unit independently instructs the relevant computer terminal to display the alert message.

Thus, it can be seen that the intended recipient has no choice as to whether his telephone is to ring or not, and the message displayed on his computer terminal is merely confirmative that the ringing telephone is in respect of a call for him.

SUMMARY OF THE INVENTION

In one aspect the present invention is concerned with solving this problem.

In accordance with a first aspect of the present invention there is provided a Computer Telephony Integration (CTI) arrangement comprising a CTI-enabled switch, a lookup table, a CTI computer, a plurality of telephone terminals to which the CTI-enabled switch can make respective originating calls, and a corresponding plurality of computer terminals accessible by the CTI computer and being respectively associated with the plurality of telephone terminals: the CTI-enabled switch being arranged (1) to respond to receipt of a call terminating thereon by
  (1a) retrieving a dialled directory number from signalling data of that terminating call, and
  (1b) sending to the CTI computer a route request signal including the retrieved dialled directory number of that terminating call,
(2) to respond to receipt of a ring back route select signal from the CTI computer by
  (2a) applying ring back treatment in respect of that terminating call,
  (2b) holding that terminating call until receipt of a further signal from the CTI computer,
(3) to respond to receipt from the CTI computer of a said further signal including a directory number by causing the telephone terminal corresponding to that received directory number to ring;

the lookup table being arranged to store a plurality of entries, each entry comprising a respective directory number associated with a respective user of the CTI arrangement, the identity of one of the computer terminals at which that respective user of the CTI arrangement is currently logged on and the directory number of the telephone terminal respectively associated with said one of the computer terminals; and the CTI computer being arranged (4) to respond to receipt from the CTI-enabled switch of that route request signal including the retrieved dialled directory number of that terminating call by
  (4a) sending to the CTI-enabled switch a ring back route select signal,
  (4b) accessing the lookup table in accordance with the retrieved dialled directory number of that terminating call to find an entry whose respective directory number associated with a respective user of the CTI arrangement matches the retrieved dialled directory number of that terminating call, that respective user being hereinafter referred to as the intended recipient,
  (4c) upon finding such an entry, retrieving from that entry the identity of said one of the computer terminals
  (4d) accessing said one of the computer terminals to cause an indication to be given that an incoming call has been received, and
(5) to respond to receipt of a command from the intended recipient at said one of the computer terminals by sending to the CTI-enabled switch a said further signal containing the directory number of the telephone terminal associated with said one of the computer terminals.

In accordance with a second aspect of the invention there is provided a method of operating a Computer Telephony Integration (CTI) arrangement comprising a CTI-enabled switch, a lookup table, a CTI computer, a plurality of telephone terminals to which the CTI-enabled switch can make respective originating calls, and a corresponding plurality of computer terminals accessible by the CTI computer and being respectively associated with the plurality of telephone terminals: the method comprising the steps of:

at the CTI-enabled switch (1) responding to receipt of a call terminating thereon by
  (1a) retrieving a dialled directory number from signalling data of that terminating call, and
  (1b) sending to the CTI computer a route request signal including the retrieved dialled directory number of that terminating call,
(2) responding to receipt of a ring back route select signal from the CTI computer by
  (2a) applying ring back treatment in respect of that terminating call,
  (2b) holding that terminating call until receipt of a further signal from the CTI computer,
(3) responding to receipt from the CTI computer of a said further signal including a directory number by causing the telephone terminal corresponding to that received directory number to ring;

storing in the lookup table a plurality of entries, each entry comprising a respective directory number associated with a respective user of the CTI arrangement, the identity of one of the computer terminals at which that respective user of the CTI arrangement is currently logged on and the directory number of the telephone terminal respectively associated with said one of the computer terminals; and at the CTI computer (4) responding to receipt from the CTI-enabled switch of that route request signal including the retrieved dialled directory number of that terminating call by
  (4a) sending to the CTI-enabled switch a ring back route select signal,
  (4b) accessing the lookup table in accordance with the retrieved dialled directory number of that terminating call to find an entry whose respective directory number associated with a respective user of the CTI arrangement matches the retrieved dialled directory number of that terminating call, that respective user being hereinafter referred to as the intended recipient, (4c) upon finding such an entry, retrieving from that entry the identity of said one of the computer terminals (4d) accessing said one of the computer terminals to cause an indication to be given that an incoming call has been received, and (5) responding to receipt of a command from that respective user at said one of the computer terminals by sending to the CTI-enabled switch a said further signal containing the directory number of the telephone terminal associated with said one of the computer terminals.

BRIEF DESCRIPTION OF THE DRAWINGS

In order that the present invention may be more readily understood, an embodiment thereof will now be described by way of example and with reference to the accompanying drawings in which.

DETAILED DESCRIPTION OF EXEMPLARY EMBODIMENTS

Figure 1:
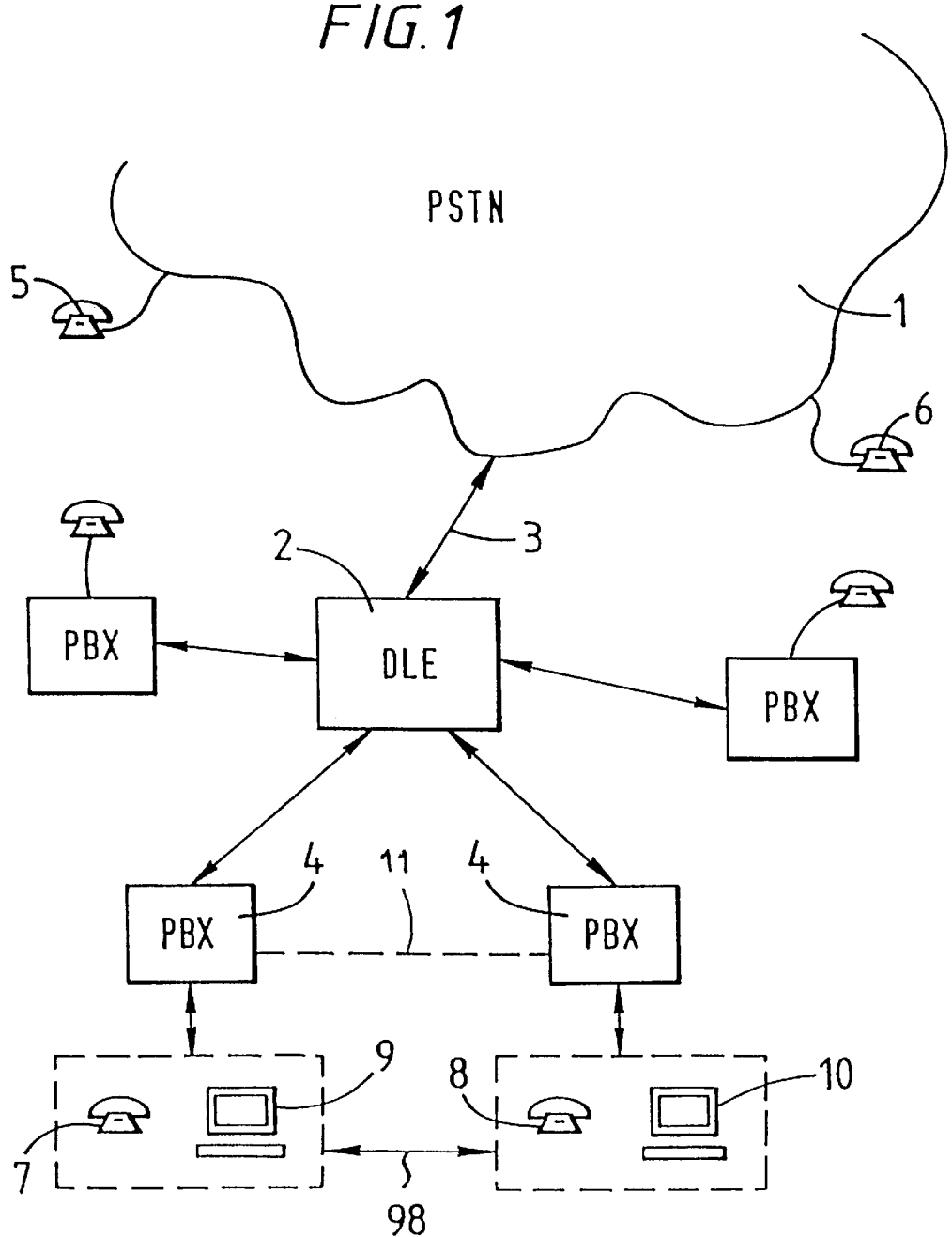
FIG. 1 is a diagram showing the general telephony environment in which the present invention operates.

Referring now to FIG. 1 of the accompanying drawings, 1 indicates the Public Switched Telephone Network (PSTN) and 2 a Digital Local Exchange (DLE) connected to the PSTN by appropriate links 3. Four PBX's 4 are shown, connected again by appropriate links to the DLE 2. Naturally the complete system will have many more DLE's and PBX's.

Figure 2:
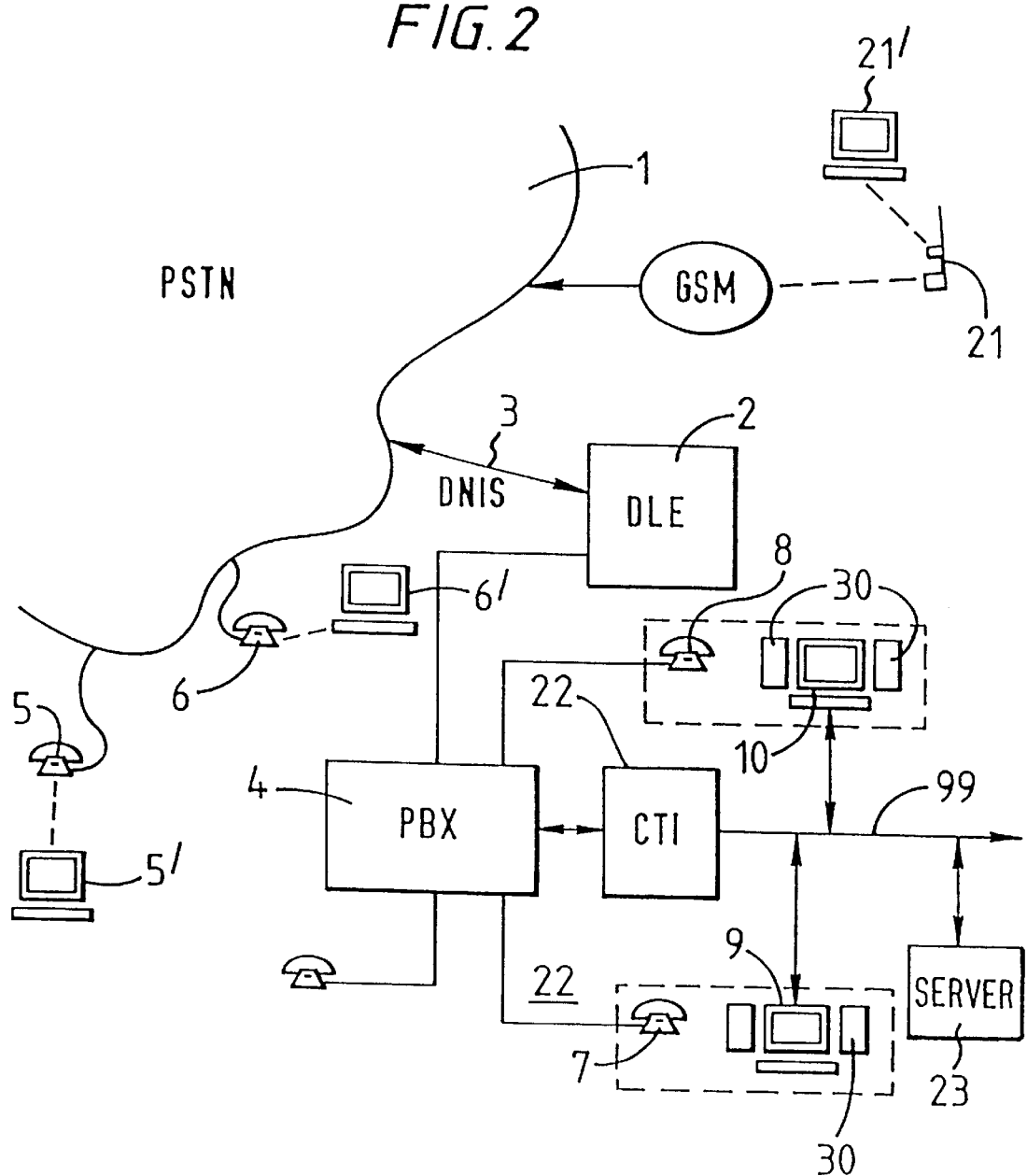
FIG. 2 is a more detailed diagram showing a part of a CTI network which incorporates the present invention.

FIG. 1 also shows individual telephones 5, 6 connected to the PSTN, and telephones 7 and 8 which are connected to the PBX's 4 and which are associated with computer terminals, also referred to as PC's, 9, 10 which are in turn connected to a conventional network server 23 (shown in FIG. 2). As shown by the dotted line 11, it is possible for the PBX's 4 to intercommunicate without having to route data via the PSTN. In a typical configuration call delivery to one of the PBX's 4 will be via Integrated Services Digital Network (ISDN) with Calling Line Identity (CLI) and Dialled Number Identification Service (DNIS). The PBX's 4 can be Meridian Option 81 (Registered Trade Mark of Northern Telecom Limited) PBX's which have been CTI enabled with a Meridian link (Registered Trade Mark of Northern Telecom Limited) for association with a CTI computer 22 (as shown in FIG. 2).

The servers from the computer side of the CTI network can be UNIX servers and the PC's can be general purpose computers operating in a Microsoft environment.

In FIG. 1 the telephones 5 and 6 are assumed to be located in users' homes and the telephones 7 and 8 and their associated PC's 9 and 10 located in an office environment. Additionally each of the "home" telephones has an associated computer 5', 6' linked with it. This is of course purely by way of illustration. While the main links to the DLE and the PBX's will be digital, the home links can be analog. In the system shown in FIG. 1 it is not possible for an incoming call to cause each of the telephones shown to ring simultaneously. The dotted boxes surrounding telephone 7 and PC 9, and telephone 8 and PC 10, indicate that the telephone and the PC in each box are associated. Additionally, link 98 indicates that the PC's 9 and 10 are part of a computer network. This network can be of any standard kind.

Referring now to FIG. 2 of the accompanying drawings, integers in this figure which are common to FIG. 1 have been given the same reference numerals. FIG. 2 additionally shows a GSM 20 linked to the PSTN 1 and to a mobile phone 21, the mobile phone having an associated lap-top computer 21'.

In FIG. 2 the telephones 7 and 8 are shown connected to a common CTI-enabled PBX 4 which is connected to a CTI computer 22 connected to a Local Area Network (LAN) 99, to which are connected the PC's 9 and 10 and the UNIX server 23. The system shown in FIG. 2 enables an incoming call from the PSTN to cause a display on the monitor of a terminal associated with the incoming call without the necessity of the telephone itself ringing. Thus the incoming call is in effect held while the presence of the incoming call is indicated at the computer terminal. An additional feature is that when the receipt of an incoming call has been displayed in this manner, the computer network can also inform other members of the network of the fact that a call has been received.

In FIG. 2 it will be seen that each office-based computer terminal besides having an associated monitor also has a pair of loudspeakers 30. The other, including the lap top, computers can have a sound card and some form of loudspeaker. Because of this when an incoming call has been detected the computer terminals can generate a ringing tone similar to the ringing of a telephone though it is likely to be advantageous if it is differentiated from the ringing tone of the telephone immediately associated with it and also if it is distinguished from the pseudo-ringing tone of other computer terminals. As a feature each computer and its sound card may be arranged so as to emit a particular ringing tone which also distinguishes it from other computers when they are alerting their users of an incoming call. Additionally when an incoming call is received at the CTI-enabled PBX 4 this is displayed at each terminal which has logged on provided that the logged on terminals have indicated that they are interested in calls to that number. As the identity of the incoming caller is displayed at each of the appropriate logged on terminals users at each of these terminals can make an informed decision as to whether or not they wish to intercept the call even if it was not initially intended for them.

The transfer of data between the CTI-enabled PBX and the computer to enable the above will now be described with regard to FIG. 3 of the drawings.

Figure 3:
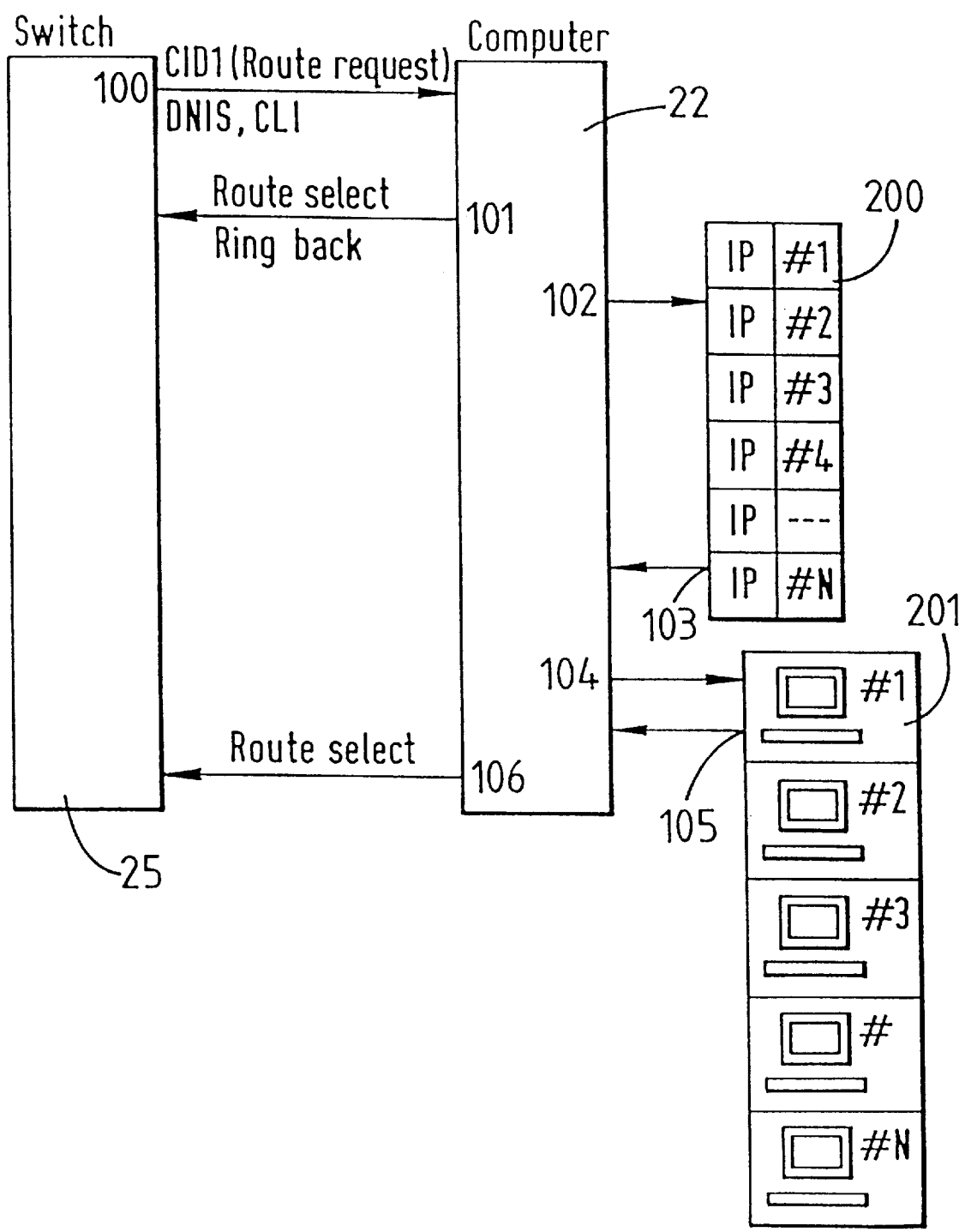
FIG. 3 is a diagram showing the flow of data between a CTI switch and a computer.

In FIG. 3 the CTI-enabled PBX 4 of FIG. 2 has been replaced by a general CTI-enabled switch indicated at 25. This is because the functions to be described can be carried out by different types of hardware. Thus CTI-enabled switch 25 could be an Interactive Voice Unit (IVU) or a PBX/ACD, that is an automatic call distributor. In fact, the actual configuration of switch 25 is not an essential factor in carrying out the present invention. This will be expanded upon hereinafter.

The interaction between the CTI-enabled switch 25 and the CTI computer 22 is as follows:

at 100 the CTI-enabled switch 25 responds to an incoming call DNIS (FIG. 2) from the PSTN and generates a Route Request Signal for the received call. This call is labelled CID1. CID means Call ID and is a unique handle for that call, with the number ("1") indicating that it is the first call in this particular sequence.

In response to the route request (CID1) the CTI computer 22 at 101 returns to the switch a Route Select Signal (Ring Back) which effectively ensures that the calling party receives a ringing tone, i.e. causes the CTI-enabled switch 25 to apply Ring Back treatment to that call. At 102 the CTI computer 22 refers to its database 200, stored for example in hard disks of the server 23, and asks to be given a list of numbers. This list corresponds to locations of computer terminals for the various users which make up a virtual work group. The list of numbers is shown at 200 and contains the internet protocol numbers (IP) of the other members of the work group. The list of numbers are returned from the server database to the CTI computer 22 at 103, and at 104 the CTI computer 22 accesses the terminals corresponding to the received list of numbers on the computer network, this network being indicated at 201. It will be appreciated that there is a wide choice available of the terminals to be accessed in response to an incoming call. Thus it is possible for a user to define on an individual basis those terminals that he wishes to be accessed when his/her phone is rung by an incoming call. It is also possible for the source of an incoming call to be identified by its call identity so as automatically to access a stored list of numbers. At each of the terminals accessed in this way an indication of an incoming call can be given by the computer using its sound card and associated loudspeakers to generate a pseudo ringing tone. As already mentioned, each computer can generate a pseudo ringing tone which is differentiated from its neighbors. The alerted users at the accessed terminals can then make a decision whether or not they wish to intercept the call, with data concerning the incoming call being supplied by a suitable screen pop and/or by the audible indication which can, as will be described, be voice synthesis. If the initial recipient decides to take the incoming call this is indicated at 105 and 106 in FIG. 3. The data sent at 106 to the CTI-enabled switch 25 will be a Route Select Signal such that the presence of the incoming call held at the CTI-enabled switch 25 will cause the selected telephone number to ring. Of course the computer terminal will already have alerted the user of that phone that a call will be coming. If one of the users of the other alerted terminals decides to intercept the call, the CTI computer 22 will send a Route Select Signal 106 including the relevant data for the CTI-enabled PBX 4 to make a call to the telephone associated with terminal at which that intercepting user is logged on. The interception of the call can be done in a variety of manners. Thus a user can use a simple manual input via a key or a pointer device such as a mouse to indicate his/her interest in the call. Alternatively, the terminal could include voice recognition and respond to a voiced command. In this context it is possible for the computer, as well as generating a ringing tone, and perhaps a screen pop, to use voice synthesis to announce the arrival of the incoming call, for whom the call was initially intended, and the identity of the calling party. It is possible that no member of the virtual work group is present or wishes to intercept the call to which they have been alerted via their computer terminals. In such a case the system may include the possibility of diverting the incoming call to a voice mail facility.

In the system just described the flexibility allowed by the presence of the computer terminal can be utilized to provide further advantageous features. Thus the computer can be configured so as to respond in a variety of different ways on receipt of an incoming call from a source. In addition to providing a display giving information with regard to the source of the incoming call and also of giving a ring which is distinctive with respect either to a normal telephone call or to a computer-type alert, the computer can be programmed to give a variety of rings which can be used to indicate either the source of the incoming call or the fact that a particular member of the group has been rung so that the user can decide whether or not to intercept the call. Thus the computer terminal can give an indication not only of the source of the call but its intended recipient on another telephone number.

If the sound generating abilities of the computer include voice synthesis then the facility of indicating the source of an incoming call or the member of the group being rung can be achieved by appropriately programmed voice announcements and there again can be specified individually for each terminal.

Thus a wide range of options are provided in the system described to specify the manner in which each computer terminal gives an alert indication that an incoming call has been received at a number in the group.

It will be appreciated that although the term group has been used in the specification this term does not imply a single fixed group. Basically for any one user the group encompasses those numbers in which the user is interested. Thus the make up of a group can vary from user to user either under the user's own choice or as decided by some other person.

To give a simple example if there are four telephone numbers in the stored list the system can generate a different ringing tone for each number with each terminal using the same set of four ringing tones. Thus when the terminal of the intended recipient of an incoming call is logged in and is alerted he/she will hear the ringing tone associated with that terminal and the other terminals within the group, which will also have been alerted, will give the same ringing tone and thus indicate to their users that somebody is trying to access a member of the group though not that specific terminal.

It is of course possible for each computer terminal to be individually configured so as to give confirmed alert indications which although specific to that terminal nevertheless differentiate between the various members of the group.

Another feature is that while a member of the group has not logged his/her terminal into the system, the terminal of those members of the group which have logged in will nevertheless give to their users indication that the incoming call has been received at the CTI-enabled switch.

It will thus be appreciated that the system described has a number of advantages.

A user can immediately identify an incoming call without actually answering it. Additionally when the members of the group are rung a user can be made aware of both the source and the destination of the incoming call and make a decision whether or not to intercept the call. The indication of an incoming call can be made in a number of different ways which can be individually tailored for each individual. The user can also be informed with regard to calls to other members of the group and can take appropriate action.

The preceding description has been directed to various specific types of switches. There is an increasing trend to utilize switching techniques which are purely based on computers or computers plus telephony cards. The exact nature of the switching system has no real relevance to the basic inventive concept of alerting a user in response to an incoming call via his or her computer terminal while the call is being held in the switch. Thus the switch associated with the computer could also be a network switch such as a public telephone exchange or any switch operated by a third party operator or a telephony company.

What is claimed is:

1. A Computer Telephony Integration (CTI) arrangement comprising
   a CTI-enabled switch,
   a lookup table,
   a CTI computer,
   a plurality of telephone terminals to which the CTI-enabled switch can make respective originating calls, and
   a corresponding plurality of computer terminals accessible by the CTI computer and being respectively associated with the plurality of telephone terminals:
   the CTI-enabled switch being arranged:
   (1) to respond to receipt of a call terminating thereon by
      (1a) retrieving a dialled directory number from signalling data of that terminating call, and
      (1b) sending to the CTI computer a route request signal including the retrieved dialled directory number of that terminating call,
   (2) to respond to receipt of a ring back route select signal from the CTI computer by
      (2a) applying ring back treatment in respect of that terminating call,
      (2b) holding that terminating call until receipt of a further signal from the CTI computer,
   (3) to respond to receipt from the CTI computer of said further signal including a directory number by causing the telephone terminal corresponding to that received directory number to ring;
   the lookup table being arranged to store a plurality of entries, each entry comprising a respective directory number associated with a respective user of the CTI arrangement, the identity of one of the computer terminals at which that respective user of the CTI arrangement is currently logged on and the directory number of the telephone terminal respectively associated with said one of the computer terminals; and
   the CTI computer being arranged:
   (4) to respond to receipt from the CTI-enabled switch of that route request signal including the retrieved dialled directory number of that terminating call by
      (4a) sending to the CTI-enabled switch a ring back route select signal,
      (4b) access sing the lookup table in accordance with the retrieved dialled directory number of that terminating call to find an entry whose respective directory number associated with a respective user of the CTI arrangement matches the retrieved dialled directory number of that terminating call, that respective user being an intended recipient,
      (4c) upon finding such entry, retrieving from that entry the identity of said one of the computer terminals,
      (4d) accessing said one of the computer terminals to cause an indication to be given that an incoming call has been received, and
   (5) to respond to receipt of a command from the intended recipient at said one of the computer terminals by sending to the CTI-enabled switch said further signal containing the directory number of the telephone terminal associated with said one of the computer terminals.

2. A CTI arrangement as claimed in claim 1, wherein the lookup table is further arranged to store an indication of each of users who constitutes a member of a common user group, and wherein the CTI computer is arranged to respond further to receipt from the CTI-enabled switch of that route request signal, in the event that the intended recipient is indicated as being a member of that user group, by accessing respective ones of the computer terminals at which members of that user group, other than the intended recipient, are currently logged on to cause an indication to be given that an incoming call has been received in respect of the intended recipient.

3. A CTI arrangement as claimed in claim 1, wherein the lookup table is further arranged to store for each of the users a respective work group effectively comprising the identities of those computer terminals which are to be accessed in response to receipt of a call for that respective user, and being representative of users who have indicated an interest in calls to that respective user; and wherein the CTI computer is further responsive to receipt from the CTI-enabled switch of that route request signal to access the respective computer terminals at which members of the respective work group corresponding to the intended recipient are logged on to cause an indication to be given that an incoming call has been received in respect of the intended recipient.

4. A CTI arrangement as claimed in claim 3, wherein the CTI computer is responsive to receipt of an intercept command from a user at said respective one of the computer terminals to send to the CTI-enabled switch said further signal containing the directory number of the telephone terminal associated with said respective one of the computer terminals whereby the CTI-enabled switch will cause that telephone terminal to ring for answering by the intercepting user.

5. A CTI arrangement as claimed in claim 1, wherein at least one of said plurality of computer terminals has an associated loudspeaker and is arranged to emit an audible indication upon being accessed by the CTI computer.

6. A CTI arrangement as claimed in claim 5, wherein two or more of said plurality of computer terminals are so arranged to emit said audible indication, and are further arranged such that the respective audible indications are different from one another.

7. A CTI arrangement as claimed in claim 5, wherein two or more of said computer terminals are so arranged to emit a said audible indication, and are further arranged, upon being accessed by the CTI computer to display an indication of the identity of the intended recipient, additionally to emitting a respective audible indication corresponding to the intended recipient.

8. A CTI arrangement as claimed in claim 1, wherein the CTI-enabled switch is further arranged to retrieve a calling line identity from said signalling data and to send the retrieved calling line identity to said CTI computer.

9. A CTI arrangement as claimed in claim 8, wherein, upon receipt of the retrieved calling line identity, the CTI computer either (i) accesses a calling line identity to calling person identity lookup table and sends the corresponding calling person identity, with or without the retrieved calling line identity, to each accessed computer terminal for display thereat, or (ii) sends the retrieved calling line identity by itself to each accessed computer terminal for display thereat.

10. A CTI arrangement as claimed in claim 9, wherein at least one of the computer terminals is arranged to convert at least one of a received calling person identity and a received calling line identity to a synthesized speech audio output.

11. A method of operating a Computer Telephony Integration (CTI) arrangement comprising a CTI-enabled switch, a lookup table, a CTI computer, a plurality of telephone terminals to which the CTI-enabled switch can make respective originating calls, and a corresponding plurality of computer terminals accessible by the CTI computer and being respectively associated with the plurality of telephone terminals, the method comprising the steps of:

at the CTI-enabled switch:
   (1) responding to receipt of a call terminating thereon by
      (1a) retrieving a dialled directory number from signalling data of that terminating call, and
      (1b) sending to the CTI computer a route request signal including the retrieved dialled directory number of that terminating call,
   (2) responding to receipt of a ring back route select signal from the CTI computer by
      (2a) applying ring back treatment in respect of that terminating call,
      (2b) holding that terminating call until receipt of a further signal from the CTI computer,
   (3) responding to receipt from the CTI computer of said further signal including a directory number by causing the telephone terminal corresponding to that received directory number to ring;

storing in the lookup table a plurality of entries, each entry comprising a respective directory number associated with a respective user of the CTI arrangement, the identity of one of the computer terminals at which that respective user of the CTI arrangement is currently logged on and the directory number of the telephone terminal respectively associated with said one of the computer terminals; and at the CTI computer:
   (4) responding to receipt from the CTI-enabled switch of that route request signal including the retrieved dialled directory number of that terminating call by
      (4a) sending to the CTI-enabled switch a ring back route select signal,
      (4b) accessing the lookup table in accordance with the retrieved dialled directory number of that terminating call to find an entry whose respective directory number associated with a respective user of the CTI arrangement matches the retrieved dialled directory number of that terminating call, that respective user being an intended recipient,
      (4c) upon finding such entry, retrieving from that entry the identity of said one of the computer terminals,
      (4d) accessing said one of the computer terminals to cause an indication to be given that an incoming call has been received, and
   (5) responding to receipt of a command from that respective user at said one of the computer terminals by sending to the CTI-enabled switch said further signal containing the directory number of the telephone terminal associated with said one of the computer terminals.

12. A method as claimed in claim 11, wherein an indication is stored of each of said users who constitutes a member of a common user group, and including the further step of responding to receipt from the CTI-enabled switch of that route request signal by accessing respective ones of the computer terminals at which members of the user group are currently logged on to cause an indication to be given that an incoming call has been received in respect of the intended recipient.

13. A method as claimed in claim 11, wherein, for each of said users, there is stored a respective work group effectively comprising the identities of those computer terminals which are to be accessed in response to receipt of a call for that respective user, and being representative of users who have indicated an interest in calls to that respective user, and including the further step of responding to receipt from the CTI-enabled switch of that route request signal by accessing the respective computer terminals dynamically associated with logged on members of the respective work group corresponding to the retrieved dialled directory number of that terminating call to cause an indication to be given that an incoming call has been received in respect of the intended recipient.

14. A method as claimed in claim 13, including the step of responding to an intercept command from a user at said respective one of the computer terminals by sending to the CTI-enabled switch a signal containing the directory number of the telephone terminal associated with said respective one of the computer terminals whereby the CTI-enabled switch will cause that telephone terminal to ring for answering by the intercepting user.

15. A method as claimed in claim 14, wherein the step of responding to an intercept command from a user at a said respective one of the computer terminals comprises responding to a vocal command from that user.

16. A method as claimed in claim 12, including the further steps of retrieving a calling line identity from said signalling data of that terminating call, sending the retrieved calling line identity to the CTI computer, and sending the retrieved calling line identity from the CTI computer to each accessed computer terminal for display thereat.

17. A method as claimed in claim 16, wherein, upon receipt of the retrieved calling line identity, the CTI computer either (i) accesses a calling line identity to calling person identity lookup table and sends the corresponding calling person identity, with or without the retrieved calling line identity, to each accessed computer terminal for display thereat, or (ii) sends the retrieved calling line identity by itself to each accessed computer terminal for display thereat.

18. A method as claimed in claim 16, including the further step of converting at at least one said accessed computer terminal a received calling line identity and/or calling person identity to synthesized speech audio output.

19. A method as claimed in claim 11, wherein said computer terminal responds to being accessed by generating an audible indication in respect of an incoming call.

20. A method as claimed in claim 19, wherein respective different audible indications are generated at two or more of the plurality of computer terminals.

21. A method as claimed in claim 19, wherein the accessing of computer terminals associated with logged on members, other than the computer terminal associated with the intended recipient, causes the generation of an audible indication corresponding to that intended recipient.

* * * * *